United States Patent [19]

Lind et al.

[11] 3,906,411

[45] Sept. 16, 1975

[54] ANTENNA TUNING APPARATUS

[75] Inventors: Harold V. Lind, Santa Ana; Gary D. Frey, Fullerton, both of Calif.

[73] Assignee: Hughes Aircraft Company, Culver City, Calif.

[22] Filed: Nov. 4, 1974

[21] Appl. No.: 520,387

[52] U.S. Cl. .................... 333/32; 333/17; 333/33; 343/703

[51] Int. Cl.$^2$ ................ G01R 27/06; H04B 17/00; H01P 5/18

[58] Field of Search ..... 333/32, 33, 10, 17 R, 17 M; 324/58 B; 325/128–130, 172, 176, 67; 332/18, 20; 343/703

[56] References Cited

UNITED STATES PATENTS 2,832,934 4/1958 Walters .......................... 333/17 M

*Primary Examiner*—James W. Lawrence
*Assistant Examiner*—Marvin Nussbaum
*Attorney, Agent, or Firm*—W. H. MacAllister; Robert H. Himes

[57] ABSTRACT

This invention relates to an antenna tuning apparatus wherein the impedance of the antenna can be matched or "tuned-up" without emitting radiation at a detectable level. More particularly, the apparatus of the present invention reduces the power density of the signal radiated while tuning an antenna by changing its character in a manner such that the radiated signal is rendered undetectable by present day apparatus stationed a reasonable distance from the transmitter.

15 Claims, 3 Drawing Figures

ANTENNA TUNING APPARATUS

BACKGROUND OF THE INVENTION

Antenna tuners are normally operated by feeding a carrier through a directional coupler to the antenna and measuring the reflected power appearing at the "reflected power" output of the directional coupler. The antenna coupler is then adjusted to minimize the reflected power reading thereby to indicate that the antenna impedance is matched to that of the driving device or transmission line. This procedure results in radiation of a carrier signal from the antenna which can be readily detected by a monitor and hence disclose the presence of the transmitter.

SUMMARY OF THE INVENTION

In accordance with the present invention, the carrier signal is bi-phase modulated with a random noise or bit pattern to spread the signal so that its density is less than the noise at the antenna. The reflected signal is then modulated by the same random noise or bit pattern to "fold" it back into a single carrier so that it can be detected in a narrow band amplifier. A monitor without access to the random noise or bit stream cannot fold the signal together to make it detectable.

An alternate embodiment of the invention initially modulates the carrier and the local oscillator signal rather than the carrier and the reflected signal. The modulated local oscillator signal is then combined with the reflected signal to generate an intermediate frequency (IF) signal that can be detected. The forward signal is also sampled to provide phase and amplitude information relative to tuning the antenna.

In both cases, a "null" in the amplitude of the reflected signal as detected is indicative of optimum tuning of the antenna.

BRIEF DESCRIPTION OF THE DRAWINGS

Referring now to FIG. 1 of the drawings, there is shown a schematic block diagram of a typical embodiment of the present invention. In particular, a signal generator 10 provides a carrier signal of frequency, $f$, which is applied to one of two inputs of a modulo 2 adder 12 which is a device which generates the least significant digit (without carries) of a binomial addition, i.e. $0 + 0 = 0$, $0 + 1 = 1$, $1 + 0 = 1$ and $1 + 1 = 0$. If the presence of a voltage is considered unity and the absence thereof zero, a phase modulator functions the same as a modulo 2 adder. The remaining input of the modulo 2 adder receives the output signal from a random noise or sequence generator 14. In the event a noise generator is used, the output should be adjusted so that there is an output signal approximately 50 percent of the time. In the case that generator 14 is employed to provide a random or nearly random sequence, a clock rate of the order of 10,000 hertz would be used which yields a bandwidth spread of 10,000 Hz. Referring to FIG. 2, 2($a$) shows a frequency spectrum 15 appearing at the output of signal generator 10 and 2($b$) shows a frequency spectrum 16 appearing at the output of modulo 2 adder 12 which is the result of phase modulating the carrier, $f_c$, with the random sequence or noise noise from generator 14. The frequency spectrum 15 of carrier, $f_c$, is a narrow line at the frequency, $f_c$, whereas the frequency spectrum 16 is spread over 10,000 Hz having a main lobe 17 centered about $f_c$ bracketed by smaller side lobes 18, 19.

Referring again to FIG. 1, the output from the modulo 2 adder 12 is connected, in the order named, through a directional coupler 20, an antenna coupler 24 to an antenna 26. The directional coupler 20 includes a forward output terminal 21 which provides a sample of the main output signal applied to antenna coupler 24 and reflected output terminal 22 which makes available the 2, 2 (from antenna coupler 24. In the embodiment of FIG. 1, nothing is connected to the forward output terminal 21 of directional coupler 20. The reflected output terminal 22, however, along with the output from the random noise or sequence generator 14 are connected to the two inputs of a modulo 2 adder 28, the amplitude of the output of which is detected by a detector 30 for unmodulated carriers. An output meter 32 connected to the output of detector 30 provides a visual means for determining the relative amplitude of the reflected carrier signal. Referring to FIG. 1, 1($c$) shows a frequency spectrum 34 appearing at the reflected output terminal 22 of directional coupler 20 which is proportional to the frequency spectrum 16 of the signal originally transmitted through the directional coupler 20. FIG. 2($d$), on the other hand, shows a frequency spectrum 36 appearing at the output of modulo 2 adder 28 which constitutes a narrow line at frequency, $f_c$, having an amplitude indicative of that of the reflected signal.

Figure 1:
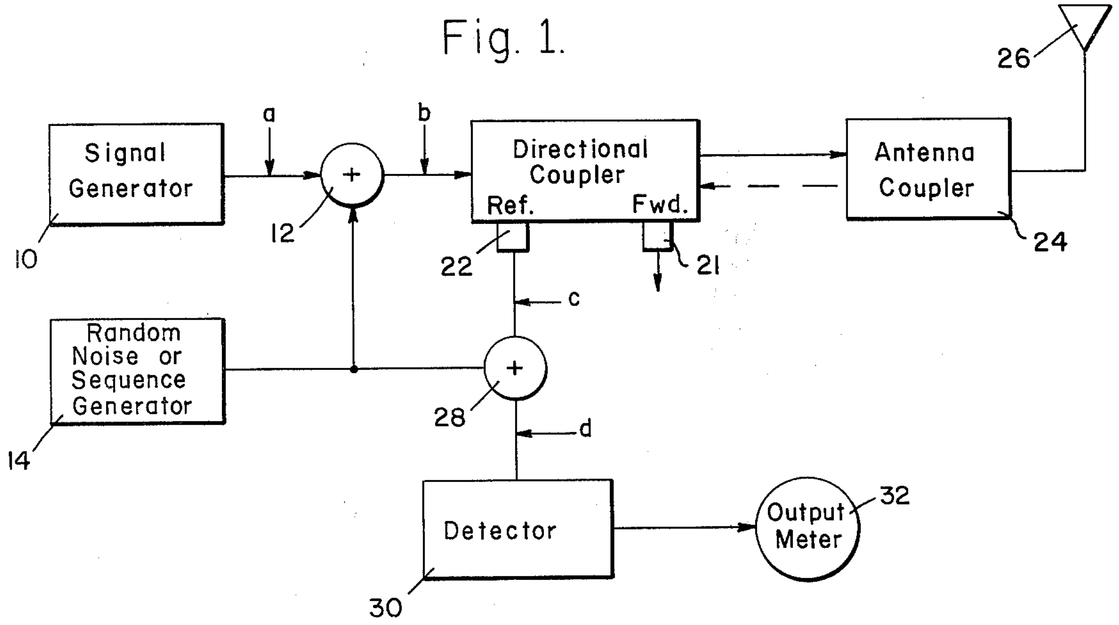
FIG. 1 illustrates a schematic block diagram of a first embodiment of the invention.

In the operation of the apparatus of FIG. 1, the signal generator 10 provides the carrier signal of frequency, $f_c$, at which the antenna 26 is to be tuned. Spectrum 15 of FIG. 2($a$) is the frequency spectrum of this signal. For the purpose of the present explanation, the random noise or sequence generator 14 will be assumed to generate a random digital sequence as follows:

0 1 1 0 0 0 1 0 1 1 1 0 0 (1)

The random digital sequence (1) is added (without carries) to the signal of frequency $f_c$ by the modulo 2 adder 12. For the purposes of explanation, each positive alternation of signal of frequency $f_c$ will be designated a 1 and each negative alternation will be designated a 0. Thus, the signal of frequency $f_c$ may be represented as follows:

1 0 1 0 1 0 1 0 1 0 1 0 1 0 (2)

A binomial addition of each respective digit to the least significant digit is as follows:

| | |
|---|---|
| 1 0 1 0 1 0 1 0 1 0 1 0 1 0 | (2) |
| 1 0 1 1 0 0 0 1 0 1 1 1 0 0 | (1) |
| 0 0 0 1 1 0 1 1 1 1 0 1 1 0 | (3) |

Figure 2:
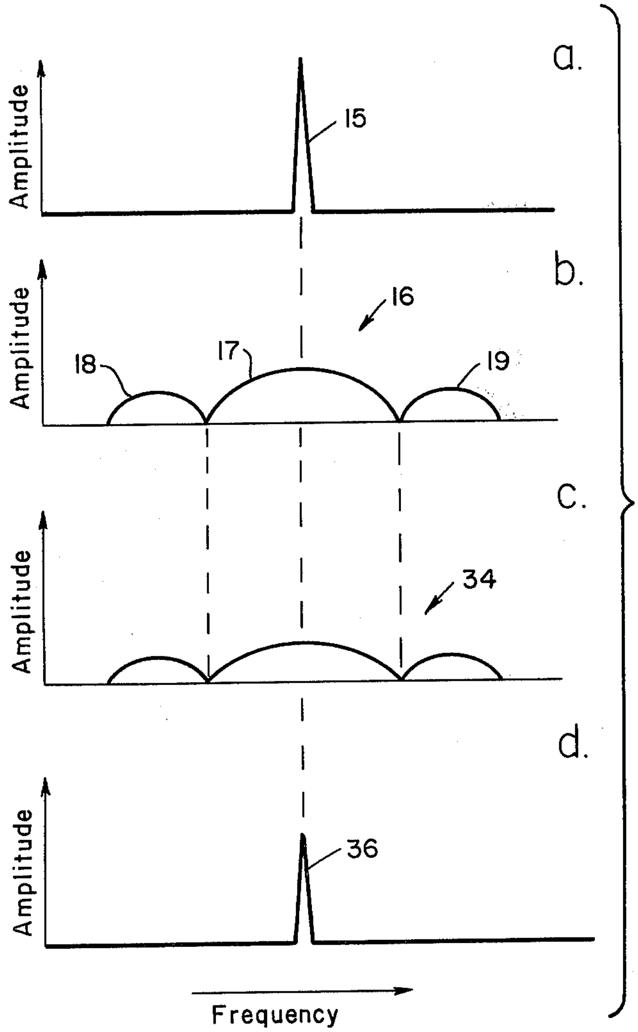
FIG. 2 shows the frequency spectrum at several junctions in the apparatus of FIG. 1.

The signal represented by the binomial sum (3) has a frequency spectrum 16 illustrated in FIG. 2($b$) of the drawings. In effect, the signal density of the signal of spectrum 15 has been spread to that of spectrum 16 so that its density is less than the noise level at antenna 26. The antenna coupler 24 is adjusted to provide a minimum reading at the output meter 32. The reflected energy from antenna coupler 24 then appears at the reflected output terminal 22 and has a spectrum 34 FIG.

2(*c*) that is proportional to spectrum 16 FIG. 2(*b*). The modulo 2 adder 28 again adds the random sequence (1) to the previous binomial sum (3) as follows:

```
0 0 0 1 1 0 1 1 1 1 0 1 1 0      (3)
1 0 1 1 0 0 0 1 0 1 1 1 0 0      (1)
_____________________________
1 0 1 0 1 0 1 0 1 0 1 0 1 0      (4)
```

Note that the sum (4) is identical to the binomial number (2) representative of the signal of frequency $f_c$ and has a spectrum 36, FIG. 2(*d*), that is proportional to the spectrum 15. The amplitude of spectrum 36 is detected by detector 30 and the amplitude information made available by output meter 32. It is not necessary for the operation of the apparatus of FIG. 1 that the frequency $f_c$ be equal to the clock rate of the random sequence generator 14. Rather a much lower clock rate will be sufficient for most applications, and in fact is necessary if the energy to the antenna is to be kept close to the desired center frequency.

Figure 3:
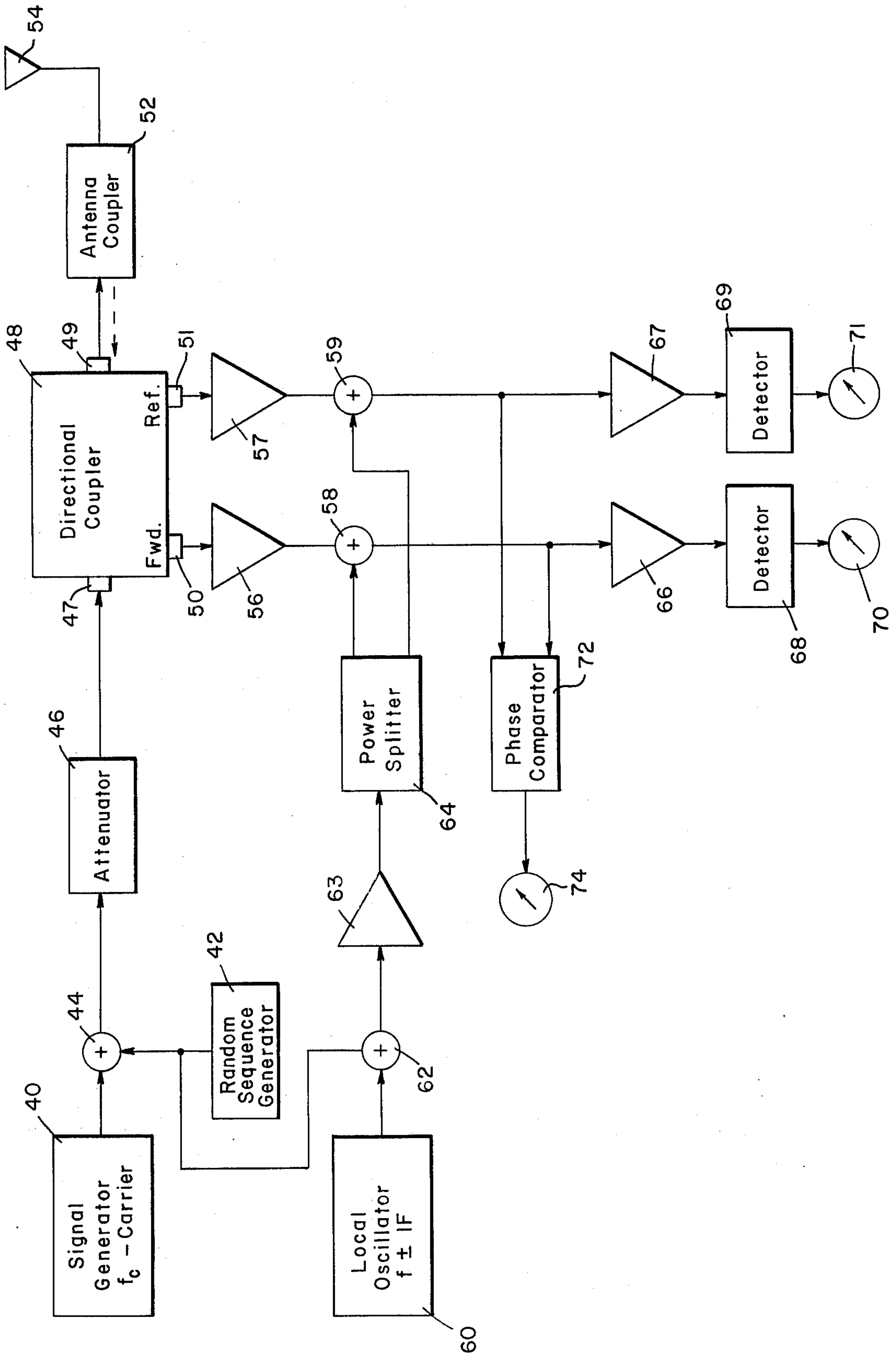
FIG. 3 illustrates a schematic block diagram of a second "super-heterodyne" embodiment of the invention.

Referring to FIG. 3, there is illustrated a superheterodyne version of the apparatus of the present invention, i.e. the reflected signal from the antenna is converted back to an intermediate frequency (IF) rather than to the original carrier frequency, $f_c$, prior to final amplification and detection. Typically this intermediate frequency is chosen to be from 1,000 to 5,000 Hz. In particular, a signal generator 40 provides a carrier signal of frequency, $f_c$, which is applied together with a random bit sequence provided by a random sequence generator 42 to respective inputs of a modulo two adder 44. The output from the modulo two adder 44 is connected through an attenuator 46 to the generator input 47 of a directional coupler 48 having a load output terminal 49, a forward signal sample output terminal 50 and a reflected signal output terminal 51. The load output terminal 49 of directional coupler 48 is connected through an antenna coupler 52 to an antenna 54. The forward signal sample terminal 50 and reflected signal output terminal 51 are connected through isolation amplifiers 56, 57, respectively, to respective inputs of modulo two adders 58, 59.

A local oscillator 60 provides a signal of frequency ($f_c$±IF), i.e. the carrier signal of frequency $f_c$ off-set by an intermediate frequency (IF) which, as previously specified, is typically from 1,000 to 5,000 cycles per second. This local oscillator signal is applied together with the random bit sequence from random sequence generator 42 to respective inputs of a modulo two adder 62. The output from modulo two adder 62 is connected through an amplifier 63 to an in-phase power splitter 64, the respective outputs of which are connected to the remaining inputs of modulo two adders 58, 59. The modulo two adders 58, 59 are, in turn, connected through linear narrowband amplifiers 66, 67 to detectors 68, 69, respectively. The detected information of detectors 68, 69 is made available by means of meters 70, 71 connected to the respective outputs thereof. Lastly, the outputs of modulo two adders 58, 59 are also connected to the inputs of a phase comparator 72 the output of which is made available by means of a phase meter 74.

In operation, the clock rate of the random sequence generator 42 is made to correspond to the spread spectrum bandwidth which may, for example, be of the order of 10,000 hertz. The spread frequency spectrum of the carrier signal of frequency, $f_c$, is attenuated to the minimum useable level by attenuator 46 and is fed to the antenna coupler 52 through the directional coupler 48. The forward sample signal available at output 50 of directional coupler 48 is a reference signal of magnitude corresponding to maximum reflection coefficient and phase reference "zero." The reflected output available at the reflected output terminal 50 of directional coupler 48, on the other hand, is the complex reflection coefficient of the load.

The local oscillator signal of frequency ($f_c$±IF) is spread in the same manner as the carrier signal by combining it with the output of random sequence generator 42 with the modulo two adder 62. The "spread" local oscillator signal is then divided by the power splitter 64 and used to demodulate the forward and reflected signals from the directional coupler 47 by means of modulo two adders 58, 59. Because the random bit sequence is identical, this signal cancels out leaving the intermediate frequency (IF) signals which are amplified by linear narrowband amplifiers 66, 67 and detected by detectors 68, 69, respectively. By adjusting the forward signal power to make the reading on meter 70 "unity," the reading on meter 71 will provide the load reflection coefficient. The phase comparator 72 provides the load reflection coefficient phase angle or "sense" information for the tuning of the antenna 54. The meter 71 which provides the magnitude of detector 69 output, i.e. the reflection coefficient output which when acceptably low is used to stop the tuning sequence. As before, the modulo two adders 44, 58, 59, 62 can be replaced with phase modulators without affecting the mode of operation of the system. Also, a pseudo random bit generator may be used provided that the bit pattern thereof is of sufficient length so as not to "reveal" that it is repetitive. A pattern of several seconds should be adequate for this purpose. Thus, an apparatus is disclosed which allows transmission of a signal having a power density at or below the antenna noise level at a nearby location thereby enabling an antenna to be tuned without revealing the presence of the transmitter.

What is claimed is:

1. An antenna apparatus comprising means for providing a carrier signal of a predetermined frequency; means for providing a random noise signal; means responsive to said carrier signal and said random noise signal for phase modulating said carrier signal with said random noise signal; antenna means capable of being tuned to said predetermined frequency; means including a directional coupler having an input terminal responsive to said phase modulated carrier signal, a load output terminal connected to said antenna means and a reflected signal output terminal for making available thereat electrical signal energy reflected from said antenna means; means for providing a local oscillator signal of a frequency different than said predetermined frequency; means responsive to said local oscillator signal and said random noise signal for phase modulating said random noise signal with said local oscillator signal; means responsive to said electrical signal energy reflected from said antenna means and said phase modulated random noise signal for phase modulating said electrical signal energy reflected from said antenna means with said phase modulated random noise signal thereby to produce a signal of substantially one frequency equal to the difference between said predetermined frequency and that of local oscillator and of an amplitude proportional to said electrical signal energy reflected from said antenna means; and means responsive to said signal of substantially one frequency for determining said amplitude whereby said antenna means can be tuned to minimize said amplitude.

2. The antenna tuning apparatus as defined in claim 1 wherein said frequency of said local oscillator signal equals 0 hertz whereby said one frequency equals said predetermined frequency.

3. The antenna tuning apparatus as defined in claim 1 wherein said frequecy of said local oscillator differs from said predetermined frequency by an intermediate frequency.

4. The antenna tuning apparatus as defined in claim 3 wherein said intermediate frequency is greater than 1,000 hertz.

5. An antenna tuning apparatus comprising means for providing a carrier signal of a predetermined frequency; means for providing a random noise signal; means responsive to said carrier signal and said random noise signal for phase modulating said carrier signal with said random noise signal; antenna means capable of being tuned to said predetermined frequency; means including a directional coupler having an input terminal responsive to said phase modulated carrier signal, a load output terminal connected to said antenna means and a reflected signal output terminal for making available thereat electrical signal energy reflected from said antenna means; means responsive to said electrical signal energy reflected from said antenna means and said random noise signal for phase modulating said electrical signal energy reflected from said antenna means with said random noise signal thereby to produce a signal of substantially one frequency equal to said predetermined frequency and of an amplitude proportional to said electrical signal energy reflected from said antenna means; and means responsive to said signal of substantially one frequency for determining said amplitude whereby said antenna means can be tuned to minimize said amplitude.

6. An antenna tuning apparatus comprising means for providing a carrier signal of a predetermined frequency; mean for providing a random bit sequence signal; means responsive to said carrier signal and said random bit sequence signal for providing a first signal equal to the binary sum without carries of said carrier signal and said random bit sequence signal, the positive alternations of said carrier being considered binary 1 and said negative alternations thereof being considered binary 0; antenna means capable of being tuned to said predetermined frequency; means including a directional coupler having an input terminal responsive to said first signal, a load output terminal connected to said antenna means and a reflected signal output terminal for making available thereat electrical signal energy reflected from said antenna means; responsive to said electrical signal energy reflected from said antenna means and said random bit sequence signal for providing a second signal of said predetermined frequency equal to the binary sum without carries of said random bit sequence signal and said electrical signal energy reflected from said antenna means; and means responsive to said second signal for determining the amplitude thereof thereby enabling said antenna means to be tuned to minimize said amplitude.

7. The antenna tuning apparatus as defined in claim 6 wherein said random bit sequence signal constitutes a pseudo-random bit sequence having a non-repetitive pattern of no less than 1 second.

8. The antenna tuning apparatus as defined in claim 6 wherein said random bit sequence signal constitutes approximately 50 percent 1 bits.

9. An antenna apparatus comprising means for providing a carrier signal of a predetermined frequency; means for providing a random bit sequence signal; a first modulo-2 adder responsive to said carrier signal and said random bit sequence signal for providing a first signal; antenna means capable of being tuned to said predetermined frequency; means including a directional coupler having an input terminal responsive to said first signal, a load output terminal connected to said antenna means and a reflected signal output terminal for making available thereat electrical signal energy reflected from said antenna means; a second modulo-2 adder responsive to said electrical signal energy reflected from said antenna means and said random bit sequence signal for providing a second signal of said predetermined frequency; and means responsive to said second signal for determining the amplitude thereof thereby enabling said antenna means to be tuned to minimize said amplitude.

10. An antenna tuning apparatus comprising means for providing a carrier signal of a predetermined frequency; means for providing a random bit sequence signal; means responsive to said carrier signal and said random bit sequence signal for providing a first signal equal to the binary sum thereof without carries; antenna means capable of being tuned to said predetermined frequency; means including a directional coupler having an input terminal responsive to said first signal, a load output terminal coupled to said antenna means and a reflected signal output terminal for making available thereat electrical signal energy reflected from said antenna means; means for providing a local oscillator signal of a frequency different than said predetermined frequency; means responsive to said local oscillator signal and said random bit sequence signal for providing a second signal equal to the binary sum thereof without carries; means responsive to said electrical signal energy reflected from said antenna means and said second signal for providing a third signal equal to the binary sum thereof without carries, said third signal having substantially one frequency equal to the difference between said predetermined frequency and that of said local oscillator signal and being of an amplitude proportional to said electric signal energy reflected from said antenna means; and means responsive to said third signal for determining said amplitude whereby said antenna means can be tuned to minimize said amplitude.

11. The antenna tuning apparatus as defined in claim 10 additionally including means for attenuating said first signal thereby to reduce electromagnetic energy radiated from said antenna means.

12. The antenna tuning apparatus as defined in claim 10 wherein said random bit has a repetitive pattern that is longer than 1 second.

13. An antenna tuning apparatus comprising means for providing a carrier signal of predetermined frequency; means for providing a random bit sequence signal; a first modulo-2 adder responsive to said carrier signal of predetermined frequency and said random bit sequence signal for providing a first signal at the output thereof; antenna means capable of being tuned to said predetermined frequency; means including a directional coupler having an input terminal responsive to said first signal, a load output terminal coupled to said antenna means and a reflected signal output terminal for making available thereat electrical signal energy reflected from said antenna means; means for providing a local oscillator signal of a frequency different from said predetermined frequency; a second modulo-2 adder responsive to said local oscillator signal and said random bit sequence signal for providing a second signal at the output thereof; a third modulo-2 adder responsive to said electrical signal energy reflected from said antenna means and said second signal for providing a third signal at the output thereof, said third signal having substantially one frequency equal to the difference between said predetermined frequency and the frequency of said local oscillator signal and being of an amplitude proportional to said electrical signal energy reflected from said antenna means; and means responsive to said third signal for determining said amplitude whereby said antenna means can be tuned to minimize said amplitude.

14. The antenna tuning apparatus as defined in claim 13 wherein said directional coupler additionally has a forward signal sample terminal and said apparatus includes a fourth modulo-2 adder responsive to the signal available at said forward signal sample terminal and said second signal for providing a fourth signal at the output thereof; and means for comparing the phase of said third and fourth signals whereby said antenna means can be tuned in a manner to decrease a difference in phase between said third and fourth signals.

15. The antenna tuning apparatus as defined in claim 13 wherein said apparatus additionally includes means interconnected between said first modulo-2 adder and said directional coupler for attentuating said first signal, means incorporated into said directional coupler for sampling said first signal; a fourth modulo-2 adder responsive to said sample of said first signal and said second signal for providing a fourth signal at the output thereof; and means for detecting said fourth signal whereby said first signal can be attenuated to produce a fourth signal of a preselected amplitude.

* * * * *